(12) United States Patent
Yoshida et al.

(10) Patent No.: US 7,414,004 B2
(45) Date of Patent: Aug. 19, 2008

(54) GAS DIFFUSION LAYER, ELECTRODE AND MEMBRANE ELECTRODE ASSEMBLY FOR FUEL CELL, AND PRODUCTION METHODS THEREOF

(75) Inventors: Akihiko Yoshida, Hirakata (JP); Yoichiro Tsuji, Katano (JP); Masaki Yamauchi, Neyagawa (JP); Yoshihiro Hori, Ikoma (JP); Makoto Uchida, Hirakata (JP); Hisaaki Gyoten, Shijonawate (JP); Teruhisa Kanbara, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 861 days.

(21) Appl. No.: 11/002,574

(22) Filed: Dec. 3, 2004

(65) Prior Publication Data

US 2005/0197246 A1    Sep. 8, 2005

(30) Foreign Application Priority Data

Dec. 4, 2003    (JP)    ............................. 2003-406018

(51) Int. Cl.
*H01M 4/88* (2006.01)
(52) U.S. Cl. .................. 502/101; 427/115; 429/30; 429/40; 429/41; 429/44
(58) Field of Classification Search ................. 502/101; 427/115; 429/30, 40, 41, 44
See application file for complete search history.

(56) References Cited

U.S. PATENT DOCUMENTS

| | | | | |
|---|---|---|---|---|
| 5,770,033 | A | * | 6/1998 | Murphy et al. ............... 205/464 |
| 5,972,196 | A | * | 10/1999 | Murphy et al. ............... 205/466 |
| 6,998,149 | B2 | | 2/2006 | Kohler et al. |
| 2003/0143454 | A1 | | 7/2003 | Hatoh et al. |
| 2003/0198860 | A1 | | 10/2003 | Yasumoto et al. |

FOREIGN PATENT DOCUMENTS

| | | | |
|---|---|---|---|
| EP | 1538689 A2 | * | 6/2005 |
| JP | 2-295065 | | 12/1990 |
| JP | 2002-056851 | * | 2/2002 |

(Continued)

OTHER PUBLICATIONS

Office Action dated May 25, 2006.

(Continued)

*Primary Examiner*—Peter D. Mulcahy
*Assistant Examiner*—Henry Hu
(74) *Attorney, Agent, or Firm*—McDermott Will & Emery LLP

(57) ABSTRACT

The present invention provides a gas diffusion layer for a fuel cell which has proper rigidity, is easy to handle and contributes to the improvement of the productivity of fuel cells. A method for producing a gas diffusion layer for a fuel cell including a first step of: impregnating a conductive porous substrate made of a conductive carbon fiber cloth or conductive carbon fiber felt with a first dispersion containing a first fluorocarbon resin having thermoplasticity; and baking the first conductive porous substrate at a first baking temperature of not less than the melting point of the first fluorocarbon resin and less than the decomposition temperature of the first fluorocarbon resin to enhance the rigidity of the conductive porous substrate.

11 Claims, 9 Drawing Sheets

FOREIGN PATENT DOCUMENTS

| | | |
|---|---|---|
| JP | 2002-056851 A | 2/2002 |
| KR | 2002-0029313 | 4/2002 |
| KR | 2002-0093136 | 12/2002 |
| KR | 2003-0014273 | 2/2003 |
| WO | WO 03/058743 A | 7/2003 |
| WO | WO-03/058743 A2 * | 7/2003 |

OTHER PUBLICATIONS

"Dictionary of Chemical Technology," Wang Zhen, Chief Editor, Chemical Industry Press, Apr. 2001.

* cited by examiner

GAS DIFFUSION LAYER, ELECTRODE AND MEMBRANE ELECTRODE ASSEMBLY FOR FUEL CELL, AND PRODUCTION METHODS THEREOF

BACKGROUND OF THE INVENTION

The present invention relates to methods for producing a gas diffusion layer, an electrode and a membrane electrode assembly for a polymer electrolyte fuel cell, and to a gas diffusion layer, an electrode and a membrane electrode assembly produced by the aforesaid methods.

Conventional polymer electrolyte fuel cells using a cation (hydrogen ion) conductive polymer electrolyte membrane simultaneously generate electricity and heat by electrochemically reacting a fuel gas containing hydrogen and an oxidant gas containing oxygen such as air.

FIG. 17 is a schematic cross sectional view illustrating a basic structure of a unit cell designed to be mounted in a conventional polymer electrolyte fuel cell. FIG. 18 is a schematic cross sectional view illustrating a basic structure of a membrane electrode assembly designed to be mounted in the unit cell 100 shown in FIG. 17. As shown in FIG. 18, in a membrane electrode assembly 101, on each surface of a polymer electrolyte membrane 111 capable of selectively transporting hydrogen ions is formed a catalyst layer 112, which is composed of carbon powder carrying an electrode catalyst such as a platinum metal catalyst thereon and a hydrogen ion conductive polymer electrolyte.

As the polymer electrolyte membrane 111, polymer electrolyte membranes made of perfluorocarbonsulfonic acid such as Nafion (trade name) manufactured by E.I. Du Pont de Nemours & Co. Inc., USA are currently widely used. On the outer surface of the catalyst layer 112 is formed a gas diffusion layer 113 made of a conductive porous substrate such as carbon paper, carbon cloth or carbon felt, which has been previously treated for water repellency. The combination of the catalyst layer 112 and the gas diffusion layer 113 forms an electrode 114 (fuel electrode or oxidant electrode).

A conventional unit cell 100 is composed of a membrane electrode assembly 101, gaskets 115 and a pair of separator plates 116. The gaskets 115 are placed on the outer periphery of the electrodes with the polymer electrolyte membrane sandwiched therebetween so as to prevent the supplied fuel gas and the supplied oxidant gas from leaking out and to prevent them from mixing with each other. The gaskets are usually integrated in advance with the electrodes and the polymer electrolyte membrane, and the whole is sometimes called "membrane electrode assembly".

On the outer surfaces of the membrane electrode assembly 101 are placed a pair of separator plates 116 for mechanically fixing the membrane electrode assembly 101. On the surface of the separator plate 116 in contact with the membrane electrode assembly 101 are formed gas channels 117 for supplying a reaction gas (fuel gas or oxidant gas) to the electrode and removing a gas containing an electrode reaction product and unreacted reaction gas from the reaction site to the outside of the electrodes. Although the gas channels 117 may be formed independently of the separator plate 116, they are usually formed by providing grooves on the surface of the separator plate as shown in FIG. 17.

As described above, the unit cell is formed by fixing the membrane electrode assembly 101 with the pair of separator plates 116. By supplying the fuel gas to the gas channels of one of the separator plates and the oxidant gas to those of the other of the separator plates, the unit cell can produce an electromotive force of about 0.7 to 0.8 V at a practical current density of several tens to several hundreds $mA/cm^2$. Polymer electrolyte fuel cells, when used as power sources, are usually required to produce a voltage of several to several hundreds volts. For this reason, in practice, the necessary number of the unit cells are connected in series and clamped to give a stack for use. In the production thereof, in order to prevent gas leakage, etc, the stack of unit cells is clamped by applying a certain clamping pressure to the stack.

The gas diffusion layer 113 constituting the electrode 114 for a conventional polymer electrolyte fuel cell as described above mainly has the following three functions: (1) to diffuse a reaction gas such as a fuel gas or an oxidant gas so as to uniformly supply the reaction gas from the gas channels 117 formed outside the gas diffusion layer 113 to the catalyst in the catalyst layer 112; (2) to rapidly carry away water produced by the reaction in the catalyst layer 112 to the gas channels 117 to prevent water clogging (flooding); and (3) to transfer the electrons necessary for the reaction and the produced electrons. As such, the gas diffusion layer 113 is required to have high reaction gas permeability, high water permeability and high electron conductivity.

In order to meet such demand, in a conventional technique, gas permeability is imparted by allowing the gas diffusion layer to have a porous structure. Water permeability is imparted by dispersing a water repellent polymer as typified by fluorocarbon resin in the gas diffusion layer. Electron conductivity is imparted by using an electron conductive material such as carbon fiber, metal fiber or carbon fine powder to make the gas diffusion layer.

In view of the above, a typical gas diffusion layer is formed by coating carbon paper serving as a conductive porous substrate with fluorocarbon resin and forming a conductive water repellent layer on the catalyst-layer-side surface of the carbon paper as described in, for example, Japanese Laid-Open Patent Publication No. Hei 2-295065. The fluorocarbon resin coating is carried out to ensure water repellency for a long period of time. The conductive water repellent layer is formed to prevent an ink for forming a catalyst layer from filling and clogging the pores when a catalyst layer is formed.

In stead of carbon paper, there is a method using carbon cloth or carbon felt as the conductive porous substrate for gas diffusion layer in order to improve the properties and to achieve low cost production, as described in Japanese Laid-Open Patent Publication No. 2002-56851. In this method, a conductive porous substrate is treated for water repellency by immersing the conductive porous substrate in a water repellent agent containing a surfactant, and then drying the conductive porous substrate at a temperature at which the surfactant is not removed. A conductive water repellent layer is then formed on the aforesaid conductive porous substrate, followed by baking.

As previously mentioned, in the production of the stack, a certain clamping pressure is applied to the stack of unit cells to prevent gas leakage. When carbon paper is used as the conductive porous substrate as described above, the above-described carbon paper hardly changes in shape during the production of the stack because the carbon paper is rigid enough. Accordingly, no problem occurs during the operation of the fuel cell to be obtained.

The carbon paper, however, is excessively rigid, so the handling thereof itself is troublesome. For example, the mass productivity and the cost efficiency might be reduced when the handling of the carbon paper during the production process is difficult. Moreover, the carbon fibers constituting the carbon paper are two-dimensionally oriented, that is, oriented in the surface direction of the carbon paper. To be more specific, they are oriented in the same direction as the flowing direction of the reaction gas in the gas channels 117 of the separator plate 116. For this reason, the flow of water moving in the thickness direction of the gas diffusion layer 113, that is, the water flow from the catalyst layer 112 to the gas channels 117 of the separator plate 116, does not go smoothly, causing water to stay and collect, which makes it likely to cause flooding.

In some cases, carbon cloth or carbon felt is used as the conductive porous substrate for constituting the gas diffusion layer 113 for purposes of optimal water repellency, low cost production, process rationalization and the improvement of productivity.

Carbon cloth and carbon felt, however, have the drawback that the carbon fibers thereof are three-dimensionally oriented and therefore micro short-circuiting is likely to occur. Moreover, when the gas diffusion layer 113 is formed using carbon cloth or carbon felt, the gas diffusion layer 113 hangs down into the gas channels 117 of the separator plate 116 since carbon cloth and carbon felt are highly flexible and not rigid enough. The hanging down of the gas diffusion layer 113 causes a greater variation in pressure loss in the gas channels 117, which makes it likely to cause flooding.

There is also a problem when forming a conductive water repellent layer on the surface of the conductive porous substrate constituting the gas diffusion layer 113. The problem is that the ink for forming a conductive water repellent layer is impregnated into the conductive porous substrate, which might inhibit the gas diffusibility of the produced gas diffusion layer 113.

Moreover, it is generally considered that, in order to improve water repellency of the water repellent layer, heat treatment, i.e., baking at a temperature exceeding the melting point of the water repellent material contained in the ink for forming a water repellent layer is desirable. But when polytetrafluoroethylene (PTFE) of high molecular weight is used as the water repellent material, the problem also arises that the baking at a temperature exceeding the melting point of PTFE reduces the adhesive strength, the ease of handling and the mass productivity, and that the conductive water repellent layer is peeled and separated from the electrode, which makes it likely to cause flooding.

BRIEF SUMMARY OF THE INVENTION

The present invention is intended to solve the problems described above. Accordingly, an object of the present invention is to discover a material having favorable water repellency and rigidity for the conductive porous substrate for constituting the gas diffusion layer. Another object of the present invention is to provide a gas diffusion layer for a fuel cell having excellent adhesiveness between the conductive porous substrate and the conductive water repellent layer, excellent gas permeability, excellent water permeability and excellent electron conductivity which is unlikely to cause micro short-circuit and flooding with the use of a low cost method which provides ease of handling and high mass productivity.

Still another object of the present invention to provide an electrode for a fuel cell having excellent adhesiveness between the conductive porous substrate and the conductive water repellent layer, excellent gas permeability, excellent water permeability and excellent electron conductivity which is unlikely to cause micro short-circuit and flooding with the use of the aforementioned gas diffusion layer for a fuel cell and a low cost method which provides ease of handling and high mass productivity.

Further still another object of the present invention to provide a membrane electrode assembly for a fuel cell having excellent adhesiveness between the conductive porous substrate and the conductive water repellent layer, excellent gas permeability, excellent water permeability and excellent electron conductivity which is unlikely to cause micro short-circuit and flooding with the use of the aforementioned electrode for a fuel cell and a low cost method which provides ease of handling and high mass productivity.

The present inventors conducted extensive studies to achieve the above objectives and found that the use of highly flexible carbon cloth or carbon felt as the conductive porous substrate for constituting the gas diffusion layer can construct a gas diffusion layer having favorable water repellency and rigidity. They further found that it is possible to, with the use of a low cost method which provides ease of handling and high mass productivity, produce a gas diffusion layer for a fuel cell having excellent adhesiveness between the conductive porous substrate and the conductive water repellent layer, excellent gas permeability, excellent water permeability and excellent electron conductivity which is unlikely to cause micro short-circuit and flooding. Based on the above findings, the present inventors have completed the present invention.

More specifically, in order to solve the above problems, the present invention provides a method for producing a gas diffusion layer for a fuel cell including a first step of:

impregnating a conductive porous substrate made of conductive carbon fiber cloth or conductive carbon fiber felt with a first dispersion containing a first fluorocarbon resin having thermoplasticity; and baking the conductive porous substrate (i.e., the first dispersion-impregnated conductive porous substrate) at a first baking temperature of not less than the melting point of the first fluorocarbon resin and less than the decomposition temperature of the first fluorocarbon resin to enhance the rigidity of the conductive porous substrate.

As just stated, by impregnating a conductive porous substrate made of conductive carbon fiber cloth or conductive carbon fiber felt with a first dispersion containing a first fluorocarbon resin having thermoplasticity and then baking the conductive porous substrate at a first baking temperature of not less than the melting point of the first fluorocarbon resin and less than the decomposition temperature of the first fluorocarbon resin, the conductive carbon fibers in the conductive porous substrate are coated with the first fluorocarbon resin. At the same time, the intersecting conductive carbon fibers in the conductive porous substrate are bonded with each other by the first fluorocarbon resin easily without failure, whereby the rigidity of the conductive porous substrate can be enhanced. Further, by using the conductive porous substrate that has favorable rigidity and is easy to handle, it is possible to produce a gas diffusion layer for a fuel cell having excellent adhesiveness between the conductive porous substrate and the conductive water repellent layer, excellent gas permeability, excellent water permeability and excellent electron conductivity which is unlikely to cause micro short-circuit and flooding with the use of a low cost method that provides high mass productivity.

The term "rigidity" of the conductive porous substrate used herein is, in other words, the resistance to the change of the shape of the conductive porous substrate. In the present invention, the "rigidity" is determined by the following equation: $t_r = 100 \times (t_p/t_0)$, where $t_0$ represents the thickness of the conductive porous substrate when no pressure is applied, $t_p$ represents the thickness of the conductive porous substrate when a pressure of 10 kgf/cm$^2$ is applied in the thickness direction of the conductive porous substrate. Accordingly, a larger value of $t_r$ means a higher rigidity of the conductive porous substrate. Conversely, a smaller value of $t_r$ means a lower rigidity of the conductive porous substrate.

The present invention further provides the method for producing a gas diffusion layer for a fuel cell further comprising, after the first step, a second step:

applying a shearing force to a second dispersion containing conductive carbon particles and a second fluorocarbon resin having thermoplasticity; applying the second dispersion onto one surface of the conductive porous substrate; and baking the conductive porous substrate (i.e., the second dispersion-applied conducive porous substrate) at a second baking temperature of less than the melting point of the second fluorocarbon resin to form a conductive water repellent layer.

As stated above, by applying a shearing force to a second dispersion containing conductive carbon particles and a second fluorocarbon resin having thermoplasticity, applying the second dispersion onto one surface of the first dispersion-impregnated conductive porous substrate, and baking the second dispersion-applied conductive porous substrate at a second baking temperature of less than the melting point of the second fluorocarbon resin to form a conductive water repellent layer, it is possible to prevent the second dispersion from infiltrating into the conductive porous substrate. This is because, when the second dispersion is applied onto the substrate, the first fluorocarbon resin, that is, the water repellent material component in the first dispersion impregnated into the conductive porous substrate, is already baked. It is therefore possible to form a conductive water repellent layer in optimal condition in which the gas diffusibility of the conductive porous substrate is not inhibited.

In addition to the above, because a shearing force is applied to the second dispersion for forming the conductive water repellent layer before the second dispersion is applied onto the substrate as stated above, the particles of the second fluorocarbon resin contained in the second dispersion are fibrillated to be in optimal condition. With this condition, it is possible to form the conductive water repellent layer almost without allowing the second fluorocarbon resin to fill in the pores of the conductive porous substrate. Moreover, the presence of the fibrillated second fluorocarbon resin particles enhances the adhesive strength between the conductive water repellent layer and the conductive porous substrate, leading to the improvement of electron conductivity. Thereby, it is possible to obtain a highly reliable gas diffusion layer for a fuel cell having excellent gas diffusibility and excellent anti-flooding characteristics.

According to the present invention, it is possible to construct the gas diffusion layer having proper water repellency and rigidity by using carbon cloth or carbon felt as the conductive porous substrate for constituting the gas diffusion layer and to produce a gas diffusion layer for a fuel cell having excellent adhesiveness between the conductive porous substrate and the conductive water repellent layer, excellent gas permeability, excellent water permeability and excellent electron conductivity which is unlikely to cause micro short-circuit and flooding with the use of a low cost method which provides ease of handling and high mass productivity.

Further, according to the present invention, it is possible to provide an electrode for a fuel cell having excellent adhesiveness between the conductive porous substrate and the conductive water repellent layer, excellent gas permeability, excellent water permeability and excellent electron conductivity which is unlikely to cause micro short-circuit and flooding with the use of the aforementioned gas diffusion layer for a fuel cell and a low cost method which provides ease of handling and high mass productivity.

Further, according to the present invention, it is possible to provide a membrane electrode assembly for a fuel cell having excellent adhesiveness between the conductive porous substrate and the conductive water repellent layer, excellent gas permeability, excellent water permeability and excellent electron conductivity which is unlikely to cause micro short-circuit and flooding with the use of the aforementioned electrode for a fuel cell and a low cost method which provides ease of handling and high mass productivity.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
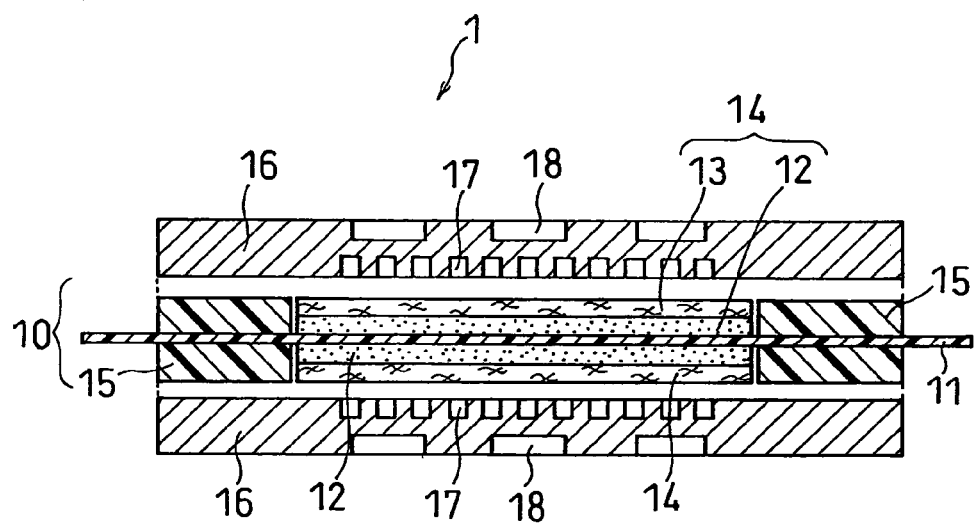
FIG. 1 is a schematic cross sectional view illustrating a basic structure of a unit cell designed to be mounted in a conventional polymer electrolyte fuel cell.

Preferred embodiments of the present invention are described below with reference to the accompanying drawings. It is to be understood that the same reference numerals are given to the same or corresponding parts, and some redundant descriptions are omitted.

Figure 2:
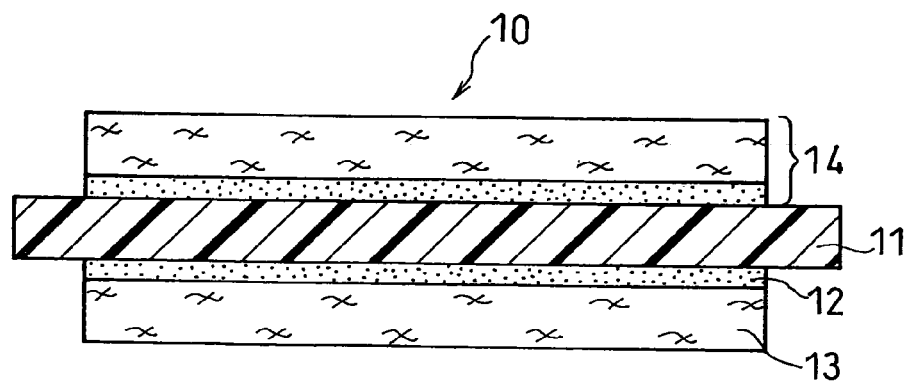
FIG. 2 is a schematic cross sectional view illustrating a basic structure of a membrane electrode assembly designed to be mounted in the unit cell shown in FIG. 1.

FIG. 1 is a schematic cross sectional view illustrating a basic structure of a unit cell designed to be mounted in a preferred embodiment of a polymer electrolyte fuel cell comprising the gas diffusion layer produced by the production method according to the present invention. FIG. 2 is a schematic cross sectional view illustrating a basic structure of a membrane electrode assembly (MEA) designed to be mounted in the unit cell 1 shown in FIG. 1.

As shown in FIG. 2, in a membrane electrode assembly 10, on each surface of a polymer electrolyte membrane 11 capable of selectively transporting hydrogen ions is formed a catalyst layer 12, which is composed of carbon powders carrying an electrode catalyst such as a platinum metal catalyst thereon and a hydrogen ion conductive polymer electrolyte. As the polymer electrolyte membrane 11, a polymer electrolyte membrane made of perfluorocarbonsulfonic acid such as Nafion (trade name) manufactured by E.I. Du Pont de Nemours & Co. Inc., USA can be used.

On the outer surface of the catalyst layer 12 is formed a gas diffusion layer 13. The combination of the catalyst layer 12 and the gas diffusion layer 13 forms an electrode 14, anode (fuel electrode) or cathode (oxidant electrode). Although not shown in the drawings, a conductive water repellent layer is formed between the catalyst layer 12 and the gas diffusion layer 13.

A unit cell 1 is mainly composed of a membrane electrode assembly 10, gaskets 15 and a pair of separator plates 16. The gaskets 15 are placed on the outer periphery of the electrodes with the polymer electrolyte membrane sandwiched therebetween so as to prevent the supplied fuel gas and the supplied oxidant gas from leaking out and to prevent them from mixing with each other. The gaskets 15 may be integrated in advance with the electrodes 14 and the polymer electrolyte membrane 11, and the combination of the gaskets 15, the electrodes 14 and the polymer electrolyte membrane 11 may be called "membrane electrode assembly".

On the outer surfaces of the membrane electrode assembly 10 are placed a pair of separator plates 16 for mechanically fixing the membrane electrode assembly 10. On the surface of the separator plate 16 in contact with the membrane electrode assembly 10 are formed gas channels 17 for supplying a reaction gas (fuel gas or oxidant gas) to the electrode and removing a gas containing an electrode reaction product and unreacted reaction gas from the reaction site to the outside of the electrodes. Although the gas channels 17 may be formed independently of the separator plate 16, they are usually formed by providing grooves on the surface of the separator plate as shown in FIG. 1.

As described above, the unit cell is formed by fixing the membrane electrode assembly 10 with the pair of separator plates 16. By supplying the fuel gas to the gas channels 17 of one of the separator plates 16 and the oxidant gas to the gas channels 17 of the other of the separator plates 16, the unit cell can produce an electromotive force of about 0.7 to 0.8 V at a practical current density of several tens to several hundreds mA/cm$^2$. Depending on the desired voltage, it is possible to connect a plurality of unit cells, each cell with not less than 2 V, in series and clamp them with current collector plates, insulating plates and end plates arranged at both ends thereof to give a stack of unit cells. While clamping, a given clamping pressure should be applied to the stack using fasteners such as bolts, nuts and rods in order to prevent gas leakage, etc.

As previously stated, the gas diffusion layer 13 of the present invention is produced by the following first step of: impregnating a conductive porous substrate made of conductive carbon fiber cloth or conductive carbon fiber felt with a first dispersion containing a first fluorocarbon resin having thermoplasticity; and baking the conductive porous substrate at a first baking temperature of not less than the melting point of the first fluorocarbon resin and less than the decomposition temperature of the first fluorocarbon resin to enhance the rigidity of the conductive porous substrate.

Thereby, the conductive carbon fibers in the conductive porous substrate is coated with the first fluorocarbon resin without decomposition of the first fluorocarbon resin, and the intersecting conductive carbon fibers in the conductive porous substrate are bonded each other by the melted first fluorocarbon resin easily without failure, whereby the rigidity of the conductive porous substrate can be increased. Moreover, the use of the conductive porous substrate that has favorable rigidity and is easy to handle provides a gas diffusion layer for a fuel cell having excellent adhesiveness between the conductive porous substrate and the conductive water repellent layer, excellent gas permeability, excellent water permeability and excellent electron conductivity which is unlikely to cause micro short-circuit and flooding with the use of a low cost method that provides high mass productivity.

The conductive carbon fiber cloth or conductive carbon fiber felt used as the conductive porous substrate in the present invention preferably has a weight per unit area of 70 to 110 g/m$^2$, more preferably 70 to 90 g/m$^2$. If the weight per unit area is less than 70 g/m$^2$, the continuous production thereof will be difficult to achieve. Conversely, if the weight per unit area exceeds 110 g/m$^2$, the gas permeability and the anti-flooding characteristics tend to be low.

Although the thickness of the conductive porous substrate is not specifically limited, the preferred thickness is 0.1 to 0.5 mm.

An example of the carbon cloth for use include carbon cloth having a weight per unit area of 80 g/m$^2$ and a thickness of 0.34 mm. An example of the carbon felt for use include carbon felt having a weight per unit area of 29 g/m$^2$ and a thickness of 0.22 mm. It is noted that both of the carbon cloth and the carbon felt are carbon-fiber-based products. Further, the carbon cloth is called woven fabric and the carbon felt is called non-woven fabric.

The first dispersion is prepared by dispersing a first fluorocarbon resin having thermoplasticity in a dispersion medium.

The dispersion medium used for preparing the first dispersion is not specifically limited as long as it does not impair the effect of the present invention. But preferably the dispersion medium contains at least one selected from the group consisting of water, methanol, propanol, n-butyl alcohol, isobutyl alcohol, sec-butyl alcohol and tert-butyl alcohol. The above listed water and alcohols may be used singly or in any combination of two or more. Considering the environmental issues and the cost, water is preferred for use as the dispersion medium of the first dispersion.

The use of an alcohol as the dispersion medium may be effective in some cases because the use of a surfactant is not necessary.

As the first fluorocarbon resin, it is preferred to use at least one selected from the group consisting of tetrafluoroethylene-hexafluoropropylene copolymer (FEP) and tetrafluoroethylene-perfluoroalkylvinylether copolymer (PFA). These copolymers are preferred because they have a relatively low melting point, and therefore they are relatively easily melt. Additionally, they have a low viscosity, and therefore the conductive carbon fibers constituting the conductive porous substrate can be coated and the intersecting conductive carbon fibers can be bonded each other easily without failure.

In the present invention, in order to give rigidity to the conductive porous substrate, it is necessary the first fluorocarbon resin bond to the intersection of the conductive carbon fibers in the conductive porous substrate. Accordingly, it is preferred that the particles of the first fluorocarbon resin be uniformly distributed throughout the conductive porous substrate and all the intersections of the conductive carbon fibers be bonded.

However, when the first fluorocarbon resin has a high melt viscosity, the first fluorocarbon resin can not be uniformly distributed throughout the conductive porous substrate. For this reason, it is not preferred to use PTFE, which has a high melt viscosity.

The first dispersion may optionally contain an additive such as a surfactant as long as the effect of the present invention is not impaired. The concentration thereof can also be determined appropriately as long as the effect of the present invention is not impaired. Attention should be given when determining the concentration of the first fluorocarbon resin because, when the concentration of the first fluorocarbon resin is too high, it is difficult to stabilize the first dispersion and to uniformly disperse the first fluorocarbon resin in the conductive porous substrate.

From the viewpoint of improving the rigidity of the conductive porous substrate while ensuring the gas permeability of the same, the amount of the first fluorocarbon resin contained in the conductive porous substrate is preferably 0.5 to 4 mg/cm$^2$ after the first dispersion is impregnated into the conductive porous substrate (i.e., after the first step).

When the amount of the first fluorocarbon resin contained in the conductive porous substrate is less than 0.5 mg/cm$^2$, the conductive porous substrate will not be rigid enough, and the gas diffusion layer 13 might hang down into the gas channels 17 of the separator plate 16, making the gas channels 17 narrow and reducing the gas diffusibility and the ability to remove water.

In order to increase the amount of the first fluorocarbon resin contained in the conductive porous substrate, usually the concentration of the first dispersion is increased. As previously stated, when the concentration of the first fluorocarbon resin is increased, it is difficult to prepare a stable first dispersion and to uniformly disperse the first fluorocarbon resin in the conductive porous substrate. Accordingly, the first fluorocarbon resin can be contained in the conductive porous substrate in an amount of up to 7 mg/cm$^2$, but further improvement of the gas diffusibility is unlikely and more uniform distribution of the first fluorocarbon resin cannot be expected. As such, the maximum amount of the first fluorocarbon resin contained in the conductive porous substrate is preferably about 4 mg/cm$^2$, more preferably 0.5 to 2 mg/cm$^2$.

The first baking temperature after the conductive porous substrate is impregnated with the first dispersion should be not less than the melting point of the first fluorocarbon resin and less than the decomposition temperature of the first fluorocarbon resin. Particularly when at least one selected from the group consisting of FEP and PFA is used as the first fluorocarbon resin, a temperature of 250 to 350° C. is preferred to ensure an increase in the rigidity, and more preferably, about 300° C.

Regardless of which copolymer (i.e. either FEP or PFA) is used as the first fluorocarbon resin, the same effect can be obtained. PFA and FEP do not have hydrocarbon molecular chains, and therefore they are chemically stable and have a low melt viscosity. For example, PFA has a viscosity at 380° C. of $10^4$ to $10^5$ P, and FEP has a viscosity at 380° C. of $4 \times 10^4$ to $10^5$ P. Accordingly, when baked at a relatively high temperature, PFA or FEP serving as the first fluorocarbon resin coats the conductive carbon fiber and bonds the intersection of the conductive carbon fibers, whereby the rigidity of the conductive porous substrate is increased easily without failure. Incidentally, PTFE has a viscosity at 380° C. of as high as $10^{11}$ to $10^{13}$ P.

In the method for producing the gas diffusion layer of the present invention, a second step is preferably performed after the first step. The second step includes the steps of applying a shearing force to a second dispersion containing conductive carbon particles and a second fluorocarbon resin having thermoplasticity, applying the second dispersion onto one surface of the conductive porous substrate, and baking the second dispersion-applied conductive porous substrate at a second baking temperature of less than the melting point of the second fluorocarbon resin to form a conductive water repellent layer.

When the second dispersion is applied onto the conductive porous substrate, the first fluorocarbon resin, i.e. the water repellent material component in the first dispersion applied onto the conductive porous substrate, is already baked, and therefore the second dispersion does not infiltrate into the conductive porous substrate. It is thus possible to form a conductive water repellent layer in optimal condition where the gas diffusibility of the conductive porous substrate is not inhibited.

Moreover, because a shearing force is applied to the second dispersion for forming the conductive water repellent layer before the second dispersion is applied onto the conductive porous substrate, the particles of the second fluorocarbon resin contained in the second dispersion are fibrillated to bring them into optimal condition, and the conductive water repellent layer can be formed almost without allowing the second fluorocarbon resin to fill in the pores of the conductive porous substrate. Further, the presence of the fibrillated second fluorocarbon resin particles enhances the adhesive strength between the conductive water repellent layer and the conductive porous substrate, leading to the improvement of electron conductivity. Thereby, it is possible to obtain a highly reliable gas diffusion layer for a fuel cell which excels in gas diffusibility and anti-flooding characteristics.

The second dispersion is prepared by dispersing conductive carbon particles and a second fluorocarbon resin having thermoplasticity in a dispersion medium.

The dispersion medium used for preparing the second dispersion is not specifically limited as long as it does not impair the effect of the present invention. But preferably the dispersion medium contains at least one selected from the group consisting of water, methanol, propanol, n-butyl alcohol, isobutyl alcohol, sec-butyl alcohol and tert-butyl alcohol. The above listed water and alcohols may be used singly or in any combination of two or more. Considering the environmental issues and the cost, water is preferred for use as the dispersion medium of the second dispersion.

The conductive carbon particles may be any conductive carbon particles that are conventionally used for conductive water repellent layers for fuel cells (so-called "C layer"). An example thereof includes carbon black. The particle size of the conductive carbon particles is not specifically limited as long as the effect of the present invention is not impaired.

As the second fluorocarbon resin, polyetrafluoroethylene (PTFE) is preferred for use. The particles PTFE are easily fibrillated, and thus the use of PTFE for the second fluorocarbon resin makes it possible to form a conductive water repellent layer almost without allowing the second fluorocarbon resin to fill in the pores of the conductive porous substrate. Further, the presence of the fibrillated second fluorocarbon resin particles enhances the adhesive strength between the conductive water repellent layer and the conductive porous substrate, leading to the improvement of electron conductivity. Thereby, it is possible to obtain a highly reliable gas diffusion layer for a fuel cell which excels in gas diffusibility and anti-flooding characteristics.

The second fluorocarbon resin preferably has a molecular weight of not less than 4,000,000 in order to achieve optimal bonding due to optimal fibril formation.

The second dispersion may further contain an additive such as a surfactant as long as the effect of the present invention is not impaired. Particularly because the conductive carbon particles and the second fluorocarbon resin are hydrophobic and tend to have poor dispersibility in water, it is preferable to use a surfactant to improve the dispersibility. The surfactant can be removed with the dispersion medium during the baking at a second temperature.

As for the composition of the second dispersion, the second dispersion preferably contains 5 to 100 parts by weight of the second fluorocarbon resin per 100 parts by weight of the conductive carbon particles. That is, the preferred weight ratio of the conductive carbon particles to the second fluorocarbon resin in the second dispersion is 20:1 to 1:1. As long as the weight ratio is within this range, good adhesive strength is obtained.

Particularly considering the conductivity and water repellency of the conductive water repellent layer, the second dispersion preferably contains 5 to 30 parts by weight of the second fluorocarbon resin per 100 parts by weight of the conductive carbon particles.

In the present invention, in order to improve the adhesive strength, it is important to increase the amount of the second fluorocarbon resin and favorably fibrillate the particles of the second fluorocarbon resin during the preparation of the conductive water repellent layer. An excessively high concentration of the second fluorocarbon resin, however, might reduce the gas diffusibility and provide excessively strong water repellency, making the ability to remove water reduced. For this reason, the preferred amount of the second fluorocarbon resin is 10 to 25 parts by weight per 100 parts by weight of the conductive carbon particles.

Before the second dispersion is applied onto one surface of the conductive porous substrate, a shearing force should be applied to the second dispersion so as to fibrillate the particles of the second fluorocarbon resin.

A sharing force can be applied to the second dispersion by stirring the second dispersion with a conventionally known stirrer or the like. Examples of the stirrer include a planetary mixer, a disperser, a kneader, a bead mill, a ball mill and a colloid mill. Among them, a planetary mixer, a disperser and a kneader are preferred because they can provide high shearing force even to the dispersions of high viscosities. Although the conditions for providing the shearing force may vary depending on the composition, viscosity and temperature of the second dispersion, they can be adjusted accordingly by controlling the shape of a stirring blade, the rotation speed and time.

In order to ensure favorable fibril formation, it is preferred to stir the second dispersion for about 30 minutes to 6 hours while the solid content of the second dispersion is maintained at about 10 to 25 weight %.

Alternatively, fibrils can be formed by applying a pressure to the second fluorocarbon resin after the second dispersion is applied onto the surface of the conductive porous substrate. Namely, in this case, the second dispersion containing the second fluorocarbon resin is applied onto the conductive porous substrate without a previous application of a shearing force and, then, the conductive porous substrate is sandwiched between rollers to apply a shearing force to the applied second fluorocarbon resin.

The second dispersion containing the fibrillated second fluorocarbon resin is preferably applied onto the conductive porous substrate such that the amount of the second fluorocarbon resin contained in the conductive water repellent layer is 3 to 8 $mg/cm^2$. When the amount is less than 3 $mg/cm^2$, the surface smoothness of the conductive water repellent layer tends to be low. Conversely, when the amount is more than 8 $mg/cm^2$, the electric resistance might be increased, or cracks might occur in which water is collected. Particularly preferred amount is 3 to 6 $mg/cm^2$.

The method for forming the conductive water repellent layer on the conductive porous substrate is not specifically limited. The second dispersion can be applied by using, for example, a spraying technique, a doctor blade technique, a coating technique, a screen-printing technique.

The second baking temperature after the second dispersion is applied onto the conductive porous substrate is preferably less than the melting point of the second fluorocarbon resin, that is, a temperature at which the fibrils of the second fluorocarbon resin do not disappear. When PTFE is used as the second fluorocarbon resin, from the viewpoint of preventing the disappearance of fibrils, the second baking temperature is preferably 250 to 325° C.

In the case where the second dispersion contains a surfactant, the second baking is preferably performed at a temperature not less than the boiling point of the surfactant. For example, when a surfactant having a boiling point of about 250 to 270° C. is used, the second baking can be performed at around 270° C., and therefore the fibrils of the second fluorocarbon resin (PTFE) are not decomposed and the adhesive strength is not reduced. When the second baking temperature exceeds 360° C., the second fluorocarbon resin (PTFE) is decomposed and also the fibrils are decomposed to disappear, reducing the adhesive strength. In addition to that, poisonous gases such as hydrogen fluoride and carbonyl fluoride might be generated.

The gas diffusion layer prepared by the method for producing a gas diffusion electrode for a fuel cell of the present invention as describe above has an improved rigidity because, by the first step in particular, the first fluorocarbon resin having a low viscosity coats the whole conductive carbon fibers to bond them with each other, whereby the bonding strength is added. This can be confirmed by the following analytical method.

[Analytical Procedure 1]

Figure 3:
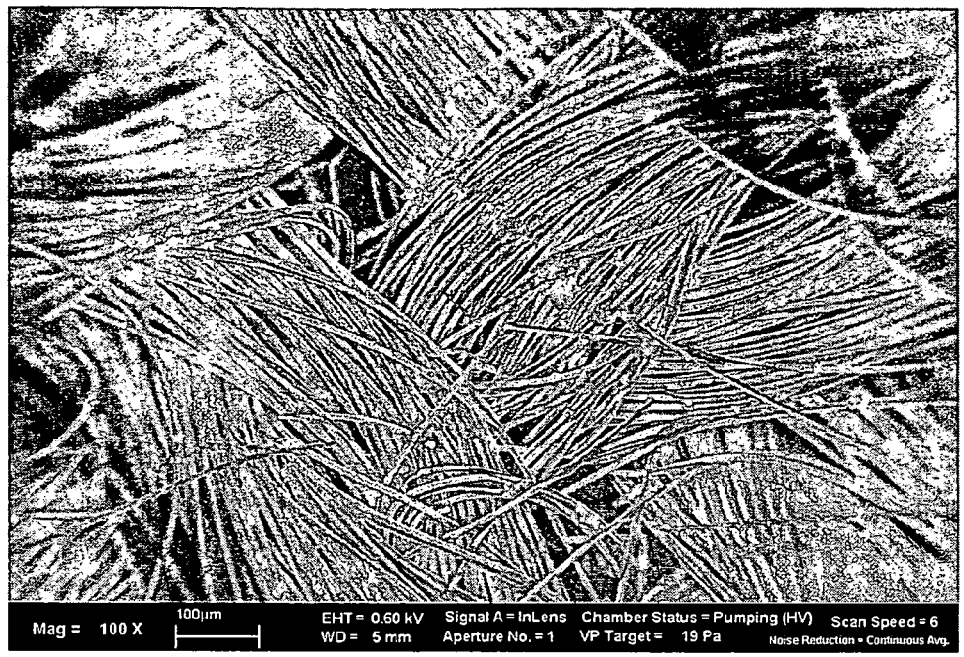
FIG. 3 is an SEM image of a gas diffusion layer prepared by a first step of the present invention.
Figure 4:
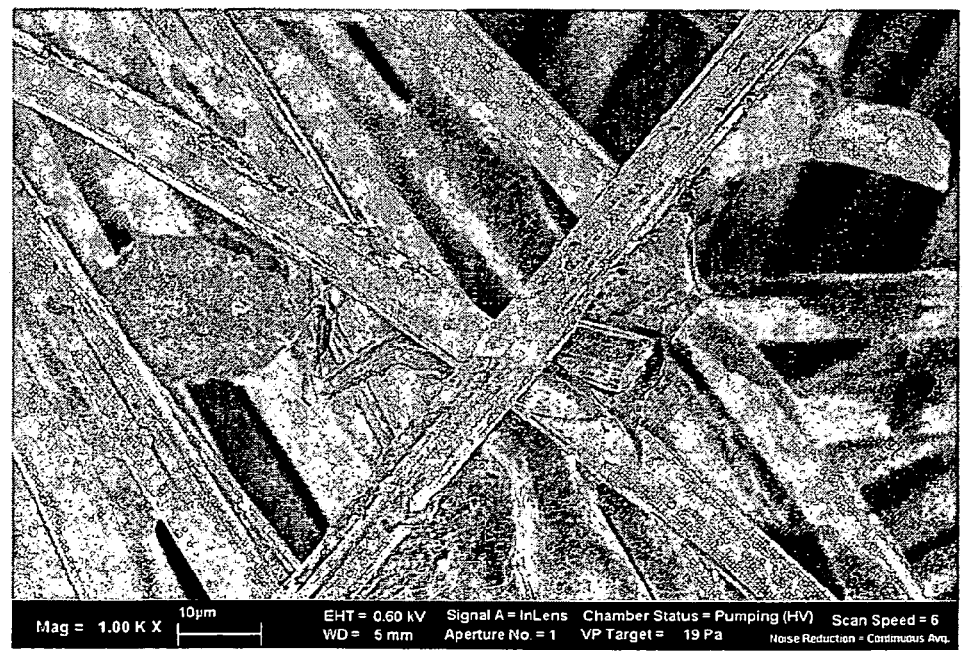
FIG. 4 is another SEM image of a gas diffusion layer prepared by a first step of the present invention.

The surface of the conductive carbon fibers of the gas diffusion layer and the intersection of the conductive carbon fibers are observed by SEM (Scanning Electron Microscope) to check for the presence of the deposit on the surface of the conductive carbon fibers and the intersections of the conductive carbon fibers. The deposits always do exist particularly at the intersections of the conductive carbon fibers. FIGS. 3 and 4 are the SEM images of the gas diffusion layer prepared in the first step of the present invention. The magnifications are shown in FIGS. 3 and 4, respectively.

[Analytical Procedure 2]

Figure 5:
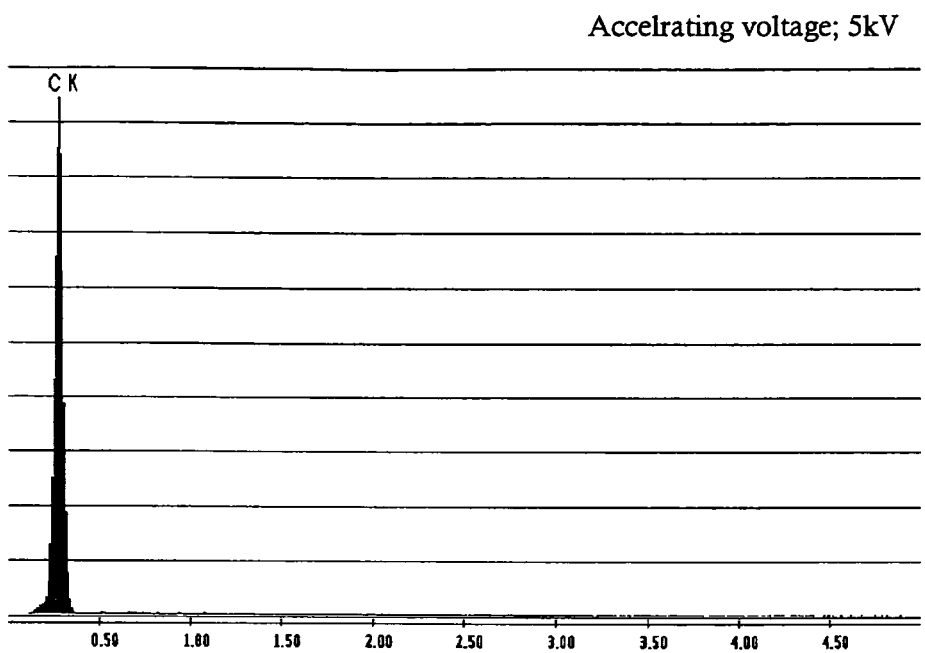
FIG. 5 is a graph showing a result of XMA when conductive carbon fiber is present.
Figure 6:
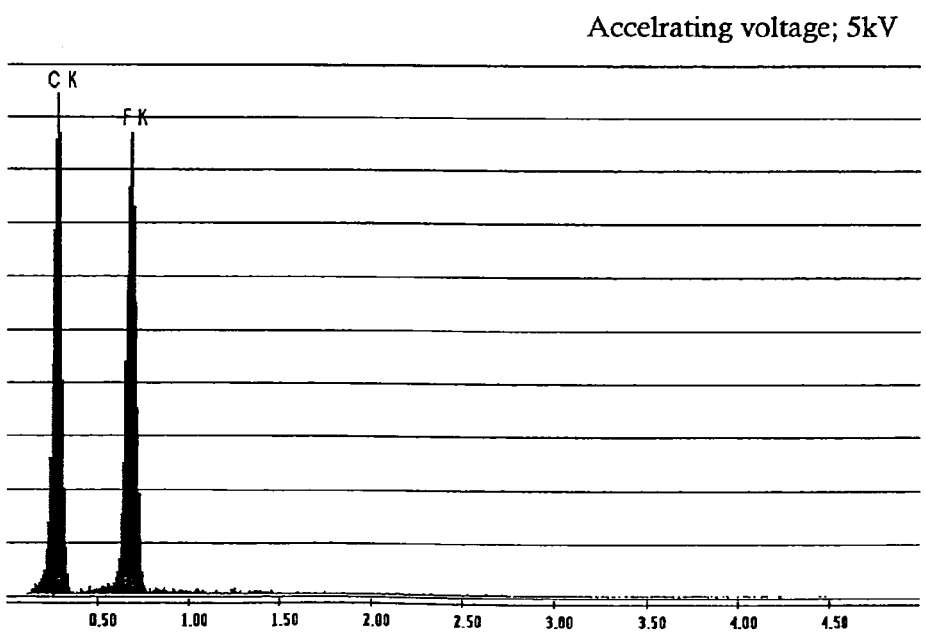
FIG. 6 is a graph showing a result of XMA when conductive carbon fiber is present.
Figure 7:
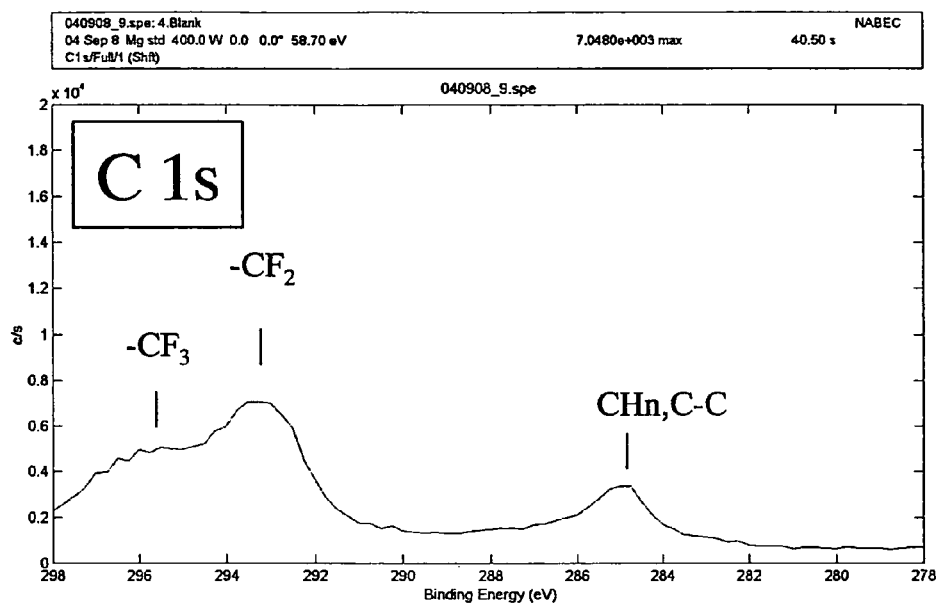
FIG. 7 is an XPS spectrum of a gas diffusion layer treated with FEP for water repellency.
Figure 8:
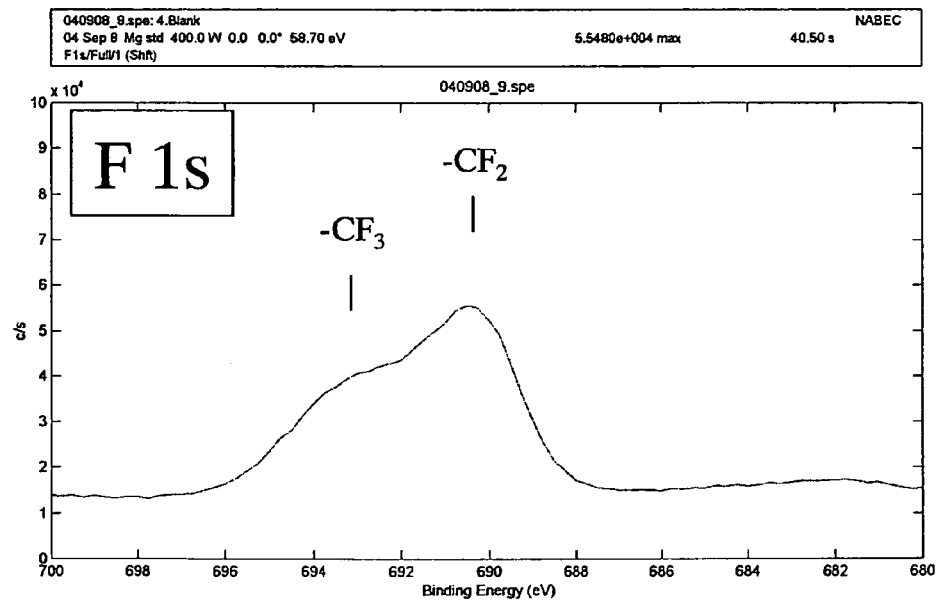
FIG. 8 is an XPS spectrum of a gas diffusion layer treated with FEP for water repellency.
Figure 9:
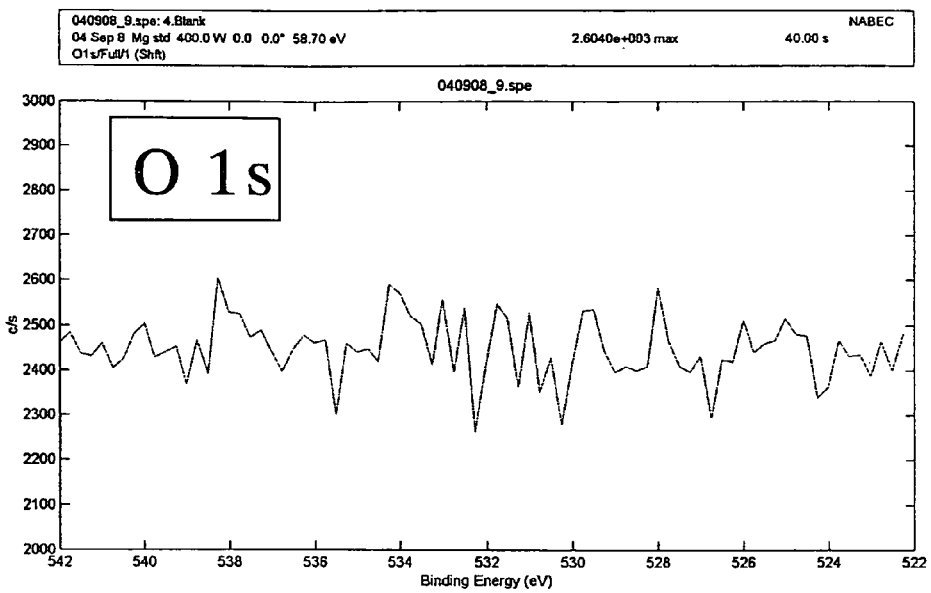
FIG. 9 is an XPS spectrum of a gas diffusion layer treated with FEP for water repellency.
Figure 10:
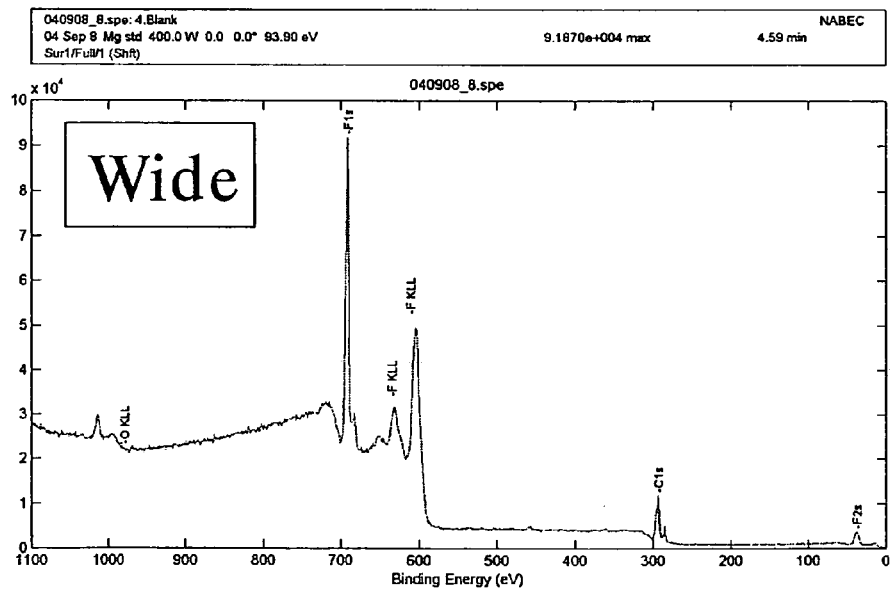
FIG. 10 is an XPS spectrum of a gas diffusion layer treated with FEP for water repellency.
Figure 11:
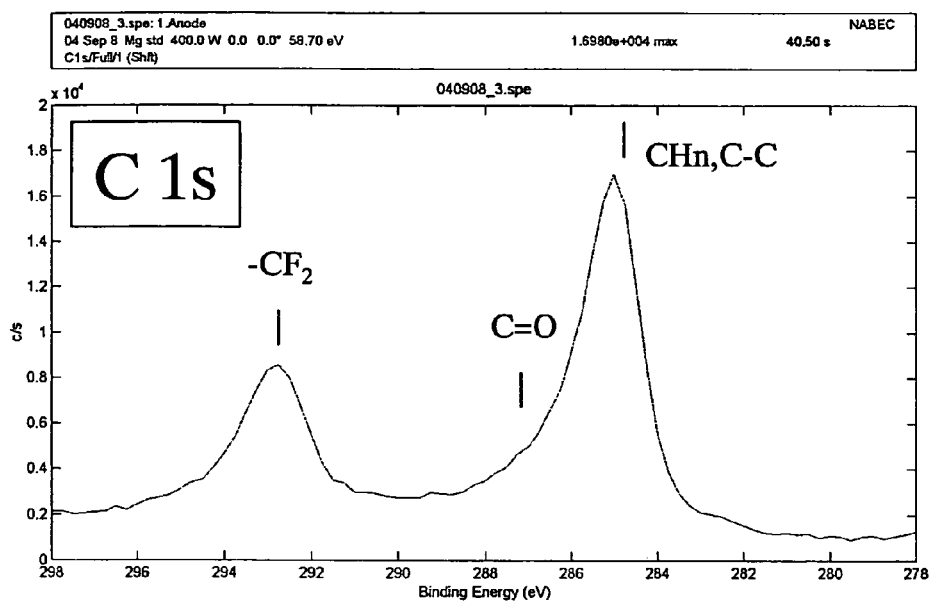
FIG. 11 is an XPS spectrum of a gas diffusion layer treated with PTFE for water repellency.
Figure 12:
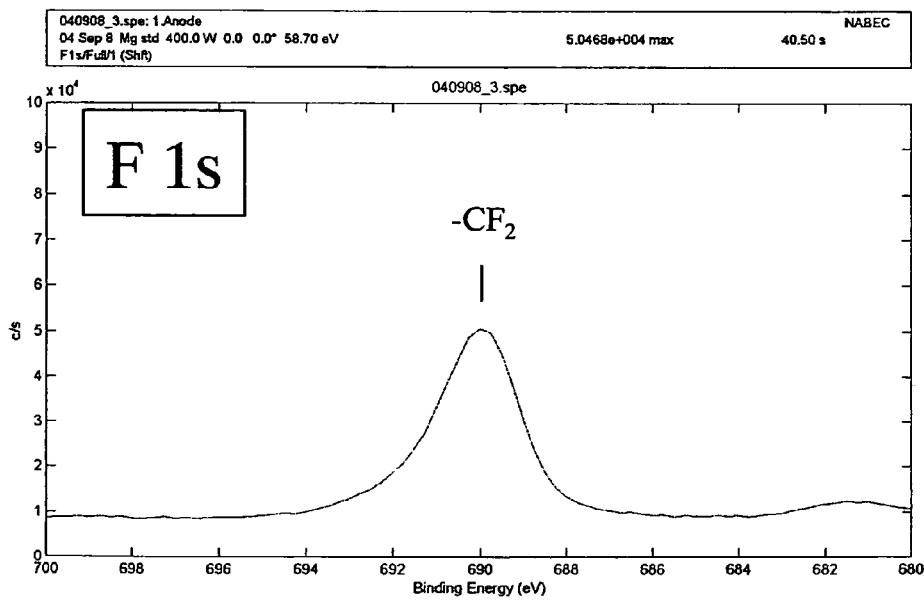
FIG. 12 is an XPS spectrum of a gas diffusion layer treated with PTFE for water repellency.
Figure 13:
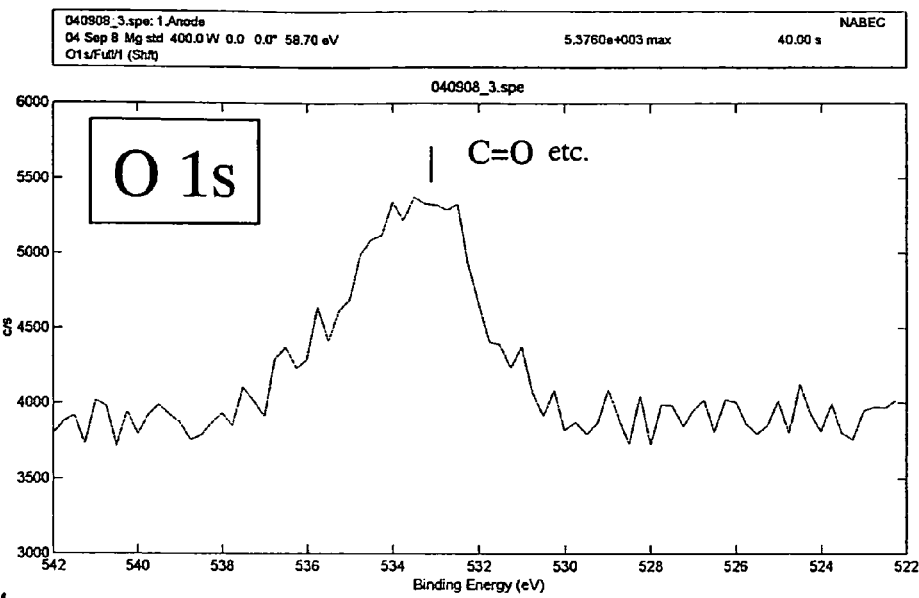
FIG. 13 is an XPS spectrum of a gas diffusion layer treated with PTFE for water repellency.
Figure 14:
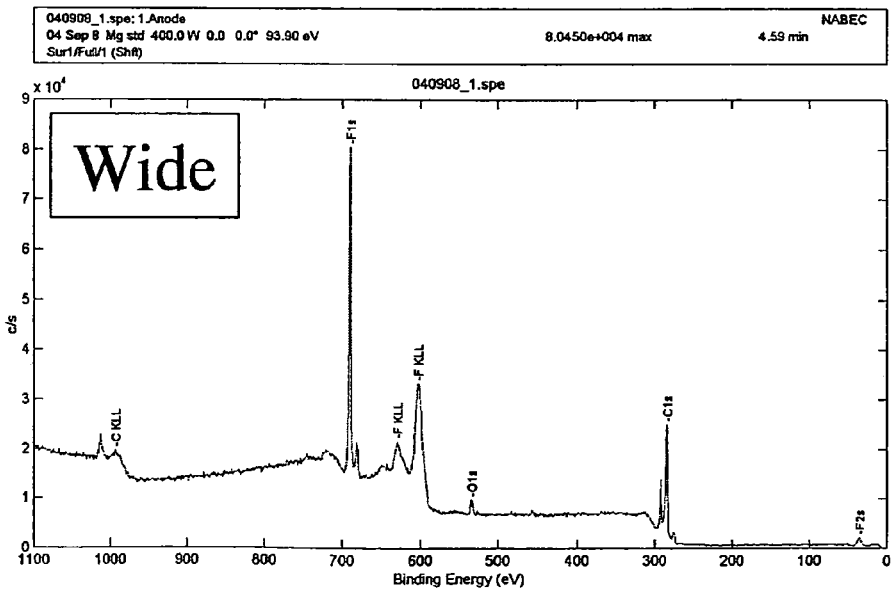
FIG. 14 is an XPS spectrum of a gas diffusion layer treated with PTFE for water repellency.

In the case where the presence of deposits is confirmed in the above analytical procedure 1, the deposits are checked by XMA (X-ray Micro Analysis) for whether they are fluorocarbon resin or not. When conductive carbon fiber is present, a peak attributed to carbon is observed in the analytical area as shown in FIG. 5. When fluorocarbon resin is present, a peak attributed to carbon and a peak attributed to fluorine are observed in the analytical area as shown in FIG. 6. FIGS. 5 and 6 are graphs showing the results of XMA.

[Analytical Procedure 3]

In the case where the deposits are determined to be fluorocarbon resin in the above analytical procedure 2, the fluorocarbon resin is checked by XPS (X-ray Photoelectron Spectroscopy) for its bonding conditions to identify the type of fluorocarbon resin.

For example, the gas diffusion layer treated with FEP for water repellency has the XPS spectra shown in FIGS. 7 to 10. The gas diffusion layer treated with PTFE for water repellency has the XPS spectra shown in FIGS. 11 to 14. Accordingly, using these XPS spectra as the reference, a comparison is made between the XPS spectrum of the gas diffusion layer of interest and the above reference XPS spectra, whereby it is possible to determine whether the fluorocarbon resin is FEP or not.

Further, a plurality of XPS spectra of gas diffusion layers treated with, for example, FEP and PTFE using different content ratios thereof are previously stored in the database. The XPS spectrum of the gas diffusion layer of interest is compared to those in the database, whereby it is possible to determine whether the fluorocarbon resin is FEP or not.

Still further, in the case where only the $C—F_2$ bond is observed in the XPS spectrum of the gas diffusion layer of interest, the fluorocarbon resin contained in the gas diffusion layer can be identified as PTFE. In the case where the $C—F_3$ bond as well as the $C—F_2$ bond are found in the XPS spectrum of the gas diffusion layer of interest, the fluorocarbon resin can be identified as FEP or PFA. The $C—O—CF_2$ bond containing an O atom may also be employed as the information for identifying the type of fluorocarbon resin.

With the use of the gas diffusion layer for a fuel cell of the present invention as described above, it is possible to provide an electrode for a fuel cell having excellent adhesiveness between the conductive porous substrate and the conductive water repellent layer, excellent gas permeability, excellent water permeability and excellent electron conductivity which is unlikely to cause micro short-circuit and flooding with the use of a low cost method which provides ease of handling and high mass productivity.

The electrode 14 for a fuel cell of the present invention can be produced using the gas diffusion layer 13 for a fuel cell of the present invention described above by a conventionally known method.

For example, an ink for forming a catalyst layer containing at least conductive carbon particles carrying an electrode catalyst made of noble metal, a hydrogen ion conductive polymer electrolyte and a dispersion medium (i.e. a liquid containing alcohol capable of dissolving or dispersing a polymer electrolyte; only a part of the polymer electrolyte may be dissolved or dispersed) is applied onto the surface of the gas diffusion layer 13 or the surface of the conductive water repellent layer (not shown in the drawings) of the gas diffusion layer 13, which is then dried to form the catalyst layer 12.

The membrane electrode assembly 10 for a fuel cell of the present invention can be produced using the above-described gas diffusion layer 13 or electrode 14 of the present invention by a conventionally known method.

In the case where the electrode 14 is first produced by forming the catalyst layer 12 on the surface of the gas diffusion layer 13 as just described above, the polymer electrolyte membrane 11 is sandwiched by two electrodes 14 with each catalyst layer 12 facing the polymer electrolyte membrane 11, which is then bonded by, for example, hot pressing to give a membrane electrode assembly of the present invention.

Alternatively, the ink for forming a catalyst layer is first applied onto the polymer electrolyte membrane 11, followed by drying to form the catalyst layer 12. The polymer electrolyte membrane having the catalyst layer thereon is bonded to the gas diffusion layer 13 of the present invention by, for example, hot pressing. In the case where the gas diffusion layer 13 has the conductive water repellent layer, the polymer electrolyte membrane and the gas diffusion layer 13 should be bonded such that the conductive water repellent layer contacts the catalyst layer 12.

As described above, according to the present invention, it is possible to obtain a gas diffusion layer for a fuel cell, an electrode for a fuel cell and a membrane electrode assembly for a fuel cell having excellent adhesiveness between the conductive porous substrate and the conductive water repellent layer, excellent gas permeability, excellent water permeability and excellent electron conductivity which is unlikely to cause micro short-circuit and flooding with the use of a low cost method which provides high mass productivity.

While the foregoing has described the embodiments of the present invention, it is to be understood that the present invention is not limited to the above-described embodiments.

For example, in a preferred embodiment of a polymer electrolyte fuel cell of the present invention described previously, an embodiment comprising one unit cell 1 was described, but the polymer electrolyte fuel cell of the present invention is not limited thereto, and the polymer electrolyte fuel cell of the present invention may comprise two or more unit cells 1.

The present invention is more specifically described below in the following examples and comparative examples, but it is to be understood that the present invention is not limited to these examples.

EXAMPLE 1

First, the first step for increasing the rigidity of the conductive porous substrate was performed.

In this example, carbon cloth with a weight per unit area of 80 g/m$^2$ wound on a cardboard core having an outer diameter of 4 inch was used as the conductive porous substrate. The carbon cloth was made of carbon fibers, which were made by using polyacrylonitrile as the raw material and had a thickness $t_0$, i.e. the thickness under no pressure, of 0.34 mm. And the thickness $t_p$, i.e. the thickness measured when a pressure of 10 kgf/cm$^2$ was applied per unit area, of the carbon cloth was 0.12 mm. From this, the rigidity $t_r$ was calculated to be about 35 (100 ×(0.12/0.34)).

Then, an FEP dispersion (first dispersion) was prepared by dispersing FEP (first fluorocarbon resin) in pure water containing a surfactant. The carbon cloth was immersed in the FEP dispersion for 1 minute, which was taken out and baked at 300° C. (first baking temperature) for 60 minutes in a far-infrared drying furnace. The baked carbon cloth had a rigidity $t_r$ of 47. The amount of FEP contained in the baked carbon cloth was 1 mg/cm$^2$. Further, the surface energy of the baked carbon cloth was measured using a reagent for measuring surface tension to be 28 dyn/cm. It is noted that the above rigidity is the rigidity of the conductive porous substrate after the first step and before the second step.

Subsequently, the second step was additionally performed using the carbon cloth of the first step.

A second dispersion for forming the conductive water repellent layer was prepared. Carbon black (conductive carbon particles) was mixed and dispersed into a mixture of pure water and a surfactant by a planetary mixer for 3 hours. To the resulting mixture were added water and PTFE having a molecular weight of about 4,000,000 to 6,000,000, which was then further kneaded for 3 hours. The shearing speed was set to 300 (1/s) by setting the rotation speed of the planetary mixer to 80 rpm. The thus-obtained second dispersion had a viscosity of 4 Pa·s and a composition of 100 parts by weight carbon black, 400 parts by weight water, 15 parts by weight PTFE and 10 parts by weight surfactant. The surfactant used here was the commercially available surfactant Triton X-100 (trade name).

The second dispersion prepared in the manner as described above was applied onto one surface of the carbon cloth of the first step using an applicator. Because the second dispersion had a high viscosity and the carbon cloth had high water repellency, the conductive water repellent layer was successfully formed completely on surface of the carbon cloth without the second dispersion filtrated into the carbon cloth. The second-dispersion-applied carbon cloth was then baked for 2 hours at 300° C. (the second baking temperature) using a hot-air dryer to form a conductive water repellent layer.

In the manner as described above, the gas diffusion layer A of the present invention was produced. The weight of the conductive water repellent layer of the produced gas diffusion layer was 5 mg/cm$^2$. The amount of PTFE contained in the conductive water repellent layer of the produced gas diffusion layer was 0.65 mg/cm$^2$.

[Adhesive Strength]

Subsequently, the adhesive strength of the conductive water repellent layer of the finished gas diffusion layer was measured as follows.

The ink for forming a catalyst layer was printed on one surface of a polymer electrolyte membrane, followed by drying to form a catalyst layer. On the catalyst layer was placed the gas diffusion layer with its conductive water repellent layer facing the catalyst layer, which was then hot-pressed while applying a pressure of 5 kgf/cm$^2$ for one minute at 100° C. to bond the gas diffusion layer. Then, the force necessary to separate the bonded gas diffusion layer from the catalyst layer was measured by cross-tension testing. The force measured was referred to as "adhesive strength" herein. The gas diffusion layer A had an adhesive strength of 5 gf/cm$^2$. Incidentally, the gas diffusion layer was cut into a size of 2 cm×10 cm before the measurement.

A gas diffusion layer having a low adhesive strength would significantly reduce the workability because the electrode might be separated or displaced during the assembly of the fuel cell. Additionally, it could negatively affect the reaction gas sealing property. Accordingly, the reliability of the fuel cell is very likely to be low.

In the case of a gas diffusion layer having an adhesive strength of about 2 to 3 gf/cm$^2$, the gas diffusion layer is bonded to the polymer electrolyte membrane immediately after the hot-pressing. However, the catalyst layer changes in size as the water content of the polymer electrolyte membrane changes, and therefore the gas diffusion layer might be separated over time. Consequently, the preferred adhesive strength is 3 gf/cm$^2$ or more.

EXAMPLES 2 to 6

Gas diffusion layers B to F of the present invention were produced in the same manner as in Example 1 except that the first and second baking temperatures listed in Table 1 were used. They were also tested for the rigidity of the conductive porous substrate after the first step and for the adhesive strength of the conductive water repellent layer of the finished gas diffusion layer after the second step in the same manner as in Example 1. The results are shown in Table 1 and FIG. 15.

TABLE 1

| Gas diffusion layer | First baking temperature (° C.) | Second baking temperature (° C.) | Rigidity | Adhesive strength (gf/cm) |
|---|---|---|---|---|
| A | 300 | 300 | 47 | 5 |
| B | 200 | 200 | 35 | 0 |
| C | 250 | 250 | 37 | 3 |
| D | 275 | 275 | 42 | 6 |
| E | 325 | 325 | 48 | 4 |
| F | 350 | 350 | 47 | 0 |

Figure 15:
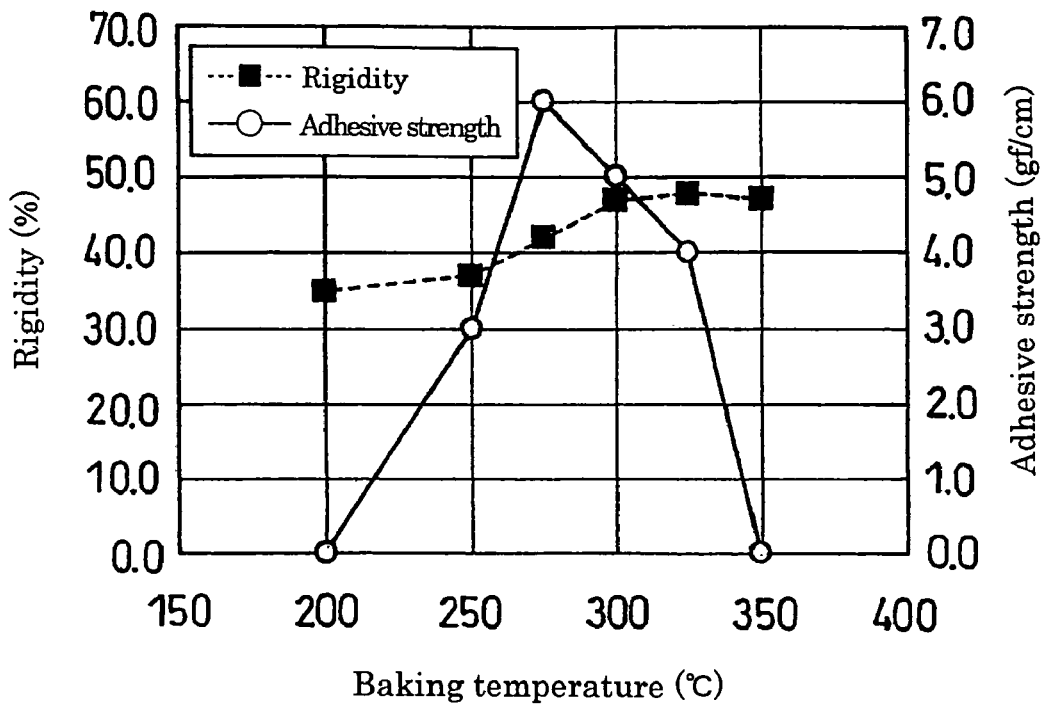
FIG. 15 is a graph showing the correlation between the first baking temperature and the rigidity of the conductive porous substrate of the first step and the correlation between the second baking temperature and the adhesive strength of the conductive water repellent layer of the second step obtained from the examples of the present invention.

As is evident from Table 1 and FIG. 15, the rigidity starts increasing when the first baking temperature of the first step reaches over 250° C. The rigidity reaches the maximum at around 300° C. Almost no increase or decrease in rigidity was observed after the first baking temperature was over 300° C. This indicates that the preferred first baking temperature is about 250 to 350° C., more preferably 300 to 350° C. because any temperature within the range brings good results.

This is because FEP softened remarkably when the temperature reached over the melting point of FEP and each conductive carbon fiber was coated with FEP. Presumably, that coating made it difficult for the conductive carbon fibers to move when a force was applied in the thickness direction of the conductive porous substrate; as a result, the rigidity was increased.

The adhesive strength, on the other hand, starts increasing significantly when the second baking temperature of the second step reaches over 250° C. When the second baking temperature reaches 350° C., however, the adhesive strength is decreased. Presumably, this is because the surfactant in the conductive water repellent layer is not completely removed at a temperature not greater than the boiling point (about 270° C.) of the surfactant and sufficient adhesive strength is unlikely to be obtained. When the second baking is performed at a temperature not less than the melting point of PTFE, the fibrils of PTFE will be burnt out to cause a decrease in adhesive strength. Accordingly, it can be concluded that the preferred second baking temperature is about 250 to 325° C., and more preferably around 275° C.

COMPARATIVE EXAMPLE 1

A gas diffusion layer G of the present invention was produced in the same manner as in Example 1 except that the first step using the first dispersion was not performed.

Figure 16:
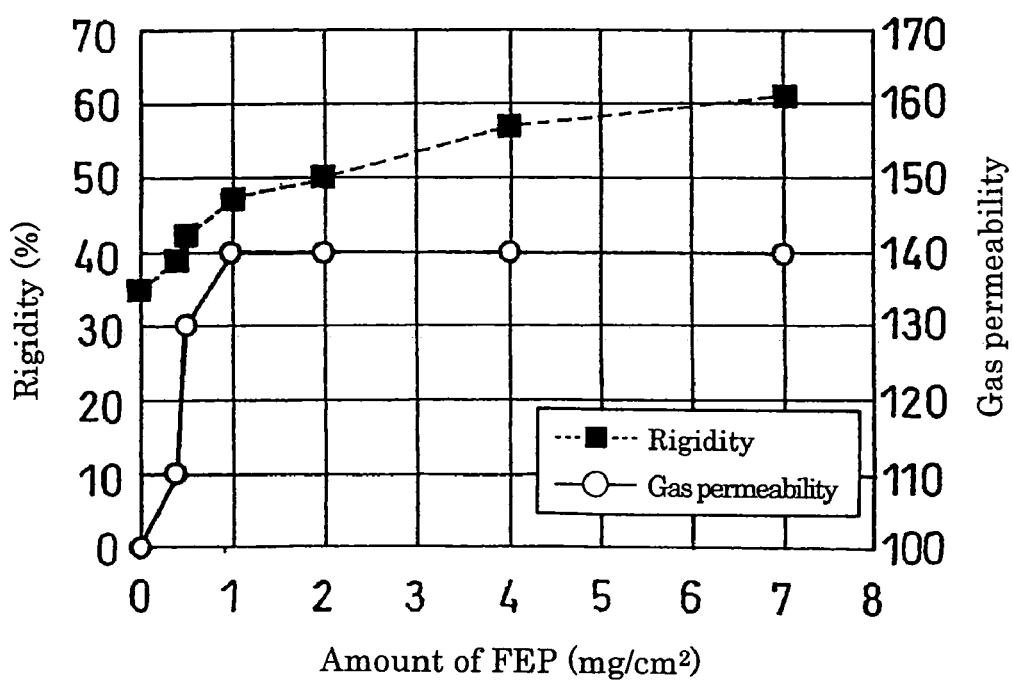
FIG. 16 is a graph showing the correlation between the amount of FEP in the conductive porous substrate and the rigidity of the conductive porous substrate and the correlation between the amount of FEP in the conductive porous substrate and the gas permeability of the gas diffusion layer.
Figure 17:
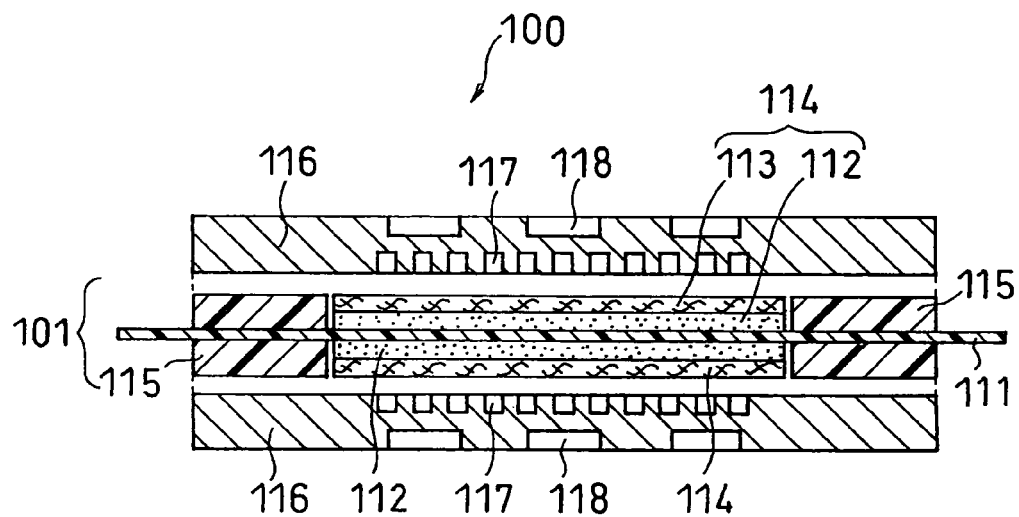
FIG. 17 is a schematic cross sectional view illustrating a basic structure of a unit cell designed to be mounted in a conventional polymer electrolyte fuel cell.
Figure 18:
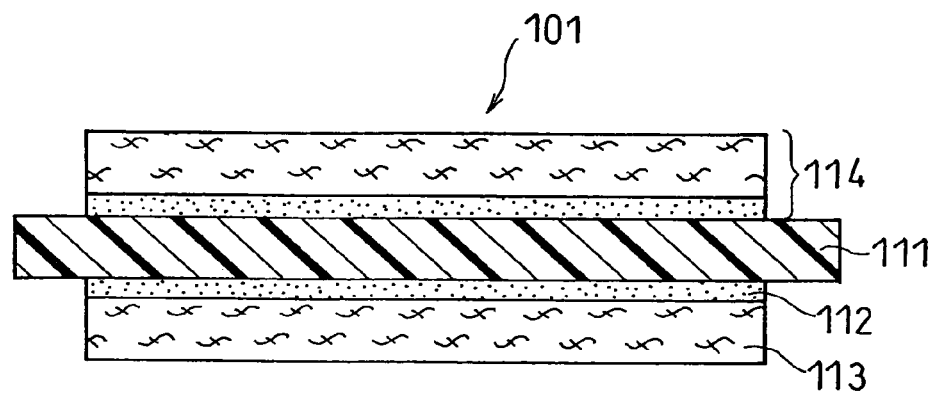
FIG. 18 is a schematic cross sectional view illustrating a basic structure of a membrane electrode assembly designed to be mounted in the unit cell shown in FIG. 17.

The amount of FEP contained in the gas diffusion layer G (=0), the rigidity before the second step and the gas permeability after the second step for the gas diffusion layer G are shown in Table 2 and FIG. 16.

COMPARATIVE EXAMPLES 2 to 7

Gas diffusion layers H to M of the present invention were produced in the same manner as in Example 1 except that the concentration of FEP in the first dispersion was adjusted such that the amount of FEP contained in each of the gas diffusion layers H to M was those listed in Table 2.

The amount of FEP contained in the gas diffusion layer, the rigidity after the first step and the gas permeability after the second step for the gas diffusion layers H to M are also shown in Table 2 and FIG. 16.

[Gas Permeability]

The gas diffusibility of the gas diffusion layers G to M produced as described above were measured as follows.

The gas diffusion layer of interest was cut into a disc shape having a diameter of 30 mm to give a sample. On the upper surface of the sample was placed a first gas-impermeable disc. On the lower surface of the same was placed a second gas-impermeable disc having a 20 mm diameter aperture in the center thereof. A pressure of 10 kgf/cm$^2$ was then applied to the both discs so that a gas supplied from the aperture of the second disc positioned on the lower surface of the sample passed through the sample to the outside.

The time taken for 300 cc of air to pass through the sample when air was supplied from the lower surface of the sample at a pressure of 1 kPa was measured. The time measured is referred to as "gas permeability" herein. In Table 2, the gas permeability is indexed with reference to that of the gas diffusion layer G (i.e. the gas diffusion layer produced without the water repellent treatment of the first step). A greater value means higher gas permeability (i.e. the gas passed through rapidly).

TABLE 2

| Gas diffusion layer | Amount of FEP (mg/cm$^2$) | Rigidity | Gas permiablility |
|---|---|---|---|
| G | 0 | 35 | 100 |
| H | 0.4 | 39 | 110 |
| I | 0.5 | 42 | 130 |
| J | 1 | 47 | 140 |
| K | 2 | 50 | 140 |
| L | 4 | 57 | 140 |
| M | 7 | 61 | 140 |

As is evident from Table 2 and FIG. 16, the rigidity of the gas diffusion layer (i.e. the conductive porous substrate after the first step) was successfully changed by changing the concentration of FEP in the first dispersion to adjust the amount of FEP contained in the baked conductive porous substratein the first step for increasing the rigidity of the conductive porous substrate. The inflection point where the rigidity starts increasing is observed at an FEP amount of 0.5 mg/cm$^2$. The increase in rigidity is moderate after 1 mg/cm$^2$.

Table 2 and FIG. 16 also show that, as the rigidity increases, the gas permeability of the gas diffusion layer under a pressure of 10 kgf/cm$^2$ also increases. The gas permeability, however, stopped increasing at an FEP amount of 1 mg/cm$^2$, which indicates that an FEP amount of about 1 mg/cm$^2$ provides the rigidity that ensures sufficient gas permeability. From the above results, the preferred amount of FEP contained in the conductive porous substrate is about 0.5 to 4 mg/cm$^2$, more preferably 0.5 to 1 mg/cm$^2$.

EXAMPLE 4

A gas diffusion layer N of the present invention was produced in the same manner as in Example 1 except that a different weight ratio of the conductive carbon particles and PTFE in the resulting conductive water repellent layer was used by changing the composition of the second dispersion. The adhesive strength of the gas diffusion layer N was measured in the same manner as in Example 1. As a result, when the weight ratio of the conductive carbon particles to PTFE in the conductive water repellent layer was 100:5 to 100:100, an adhesive strength of not less than 3 gf/cm$^2$ was obtained.

The conductivity of the conductive water repellent layer, however, decreases proportionally with the ratio of PTFE. Accordingly, from the viewpoint of the conductivity, the preferred mass ratio of the conductive carbon particles and PTFE in the conductive water repellent layer is 100:5 to 100:30.

[Evaluation]

In the above-described gas diffusion layers A to F and H to M of the present invention, the present inventors found that the coating percentage of FEP over the conductive carbon fiber can be determined by measuring the atomic ratio of C and F with the use of XPS.

Then, they confirmed, by XPS analysis, the disadvantages of PTFE as well as the fact that the FEP can coat almost the whole surface of the conductive carbon fibers constituting the conductive porous substrate as compared to PTFE only.

The present inventors further confirmed, by XPS analysis, that the conductive carbon fibers can be bonded (or integrated) more sufficiently by using FEP than PTFE only.

Moreover, it is obvious, from the rigidity levels obtained in the above examples, that the gas diffusion layers H to M treated with FEP for rigidity (i.e. water repellency) in the first step had a higher rigidity than the gas diffusion layer G treated with PTFE only for water repellency in the second step.

The present inventors further confirmed, from the observation by SEM, that PTFE in the form of particles remained in the gas diffusion layer G, which was treated with PTFE only for water repellency in the second step at a low temperature (275° C.), and that FEP in the form of particles was not observed in the gas diffusion layers A to F and H to M, which were treated with FEP for rigidity (water repellency) in the first step.

As described above, according to the present invention, with the use of carbon cloth or carbon felt as the conductive porous substrate for constituting the gas diffusion layer, it is possible to provide a gas diffusion layer for a fuel cell having excellent adhesiveness between the conductive porous substrate and the conductive water repellent layer, excellent gas permeability, excellent water permeability and excellent electron conductivity which is unlikely to cause micro short-circuit and flooding in a low cost method which provides high mass productivity. Fuel cells including the gas diffusion layer excel in anti-flooding characteristics and have excellent battery characteristics, and therefore they are suitable for fuel cell vehicle and home cogeneration system applications.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing a gas diffusion layer for a fuel cell comprising a first step of:
    impregnating a conductive porous substrate made of conductive carbon fiber cloth or conductive carbon fiber felt with a first dispersion containing a first fluorocarbon resin having thermoplasticity; and baking said conductive porous substrate at a first baking temperature of not less than the melting point of said first fluorocarbon resin and less than the decomposition temperature of said first fluorocarbon resin to enhance the rigidity of said conductive porous substrate, and after said first step, a second step of:

applying a shearing force to a second dispersion containing conductive carbon particles and a second fluorocarbon resin having thermoplasticity; applying said second dispersion onto one surface of said conductive porous substrate; and baking said conductive porous substrate at a second baking temperature of less than the melting point of said second fluorocarbon resin to form a conductive water repellent layer, wherein, in said first step, said first fluorocarbon resin is at least one selected from the group consisting of tetrafluoroethylene-hexafluoropropylene copolymer and tetrafluoroethylene-perfluoroalkylvinylether copolymer, and in said second step, said second fluorocarbon resin is polytetrafluoroethylene.

2. The method for producing a gas diffusion layer for a fuel cell in accordance with claim 1, wherein, in said first step, said first dispersion is impregnated into said conductive porous substrate such that the amount of said first fluorocarbon resin contained in said conductive porous substrate becomes 0.5 to 4 mg/cm$^2$.

3. The method for producing a gas diffusion layer for a fuel cell in accordance with claim 1, wherein, in said first step, said first baking temperature is 250 to 350° C.

4. The method for producing a gas diffusion layer for a fuel cell in accordance with claim 1, wherein, in said second step, the weight ratio of said conductive carbon particles to said second fluorocarbon resin in said second dispersion is 20:1 to 1:1.

5. The method for producing a gas diffusion layer for a fuel cell in accordance with claim 1, wherein, said second dispersion is applied onto said conductive porous substrate such that the amount of said second fluorocarbon resin contained in said conductive water repellent layer becomes 3 to 8 mg/cm$^2$ in said second step.

6. The method for producing a gas diffusion layer for a fuel cell in accordance with claim 1, wherein, in said second step, the second baking temperature is 250 to 325° C.

7. A method for producing an electrode for a fuel cell using the gas diffusion layer produced by the production method in accordance with any one of claims 1, 2, 3, 4 to 6.

8. A method for producing a membrane electrode assembly for a fuel cell using the electrode produced by the production method in accordance with claim 7.

9. A gas diffusion layer for a fuel cell produced by the production method in accordance with any one of claims 1, 2, 3, 4 to 6.

10. An electrode for a fuel cell produced by the production method in accordance with claim 7.

11. A membrane electrode assembly for a fuel cell produced by the production method in accordance with claim 8.

* * * * *